United States Patent Office 3,340,310
Patented Sept. 5, 1967

3,340,310
2,2-BIS(4-HYDROXYPHENYL)1,1,3,3,-TETRA-FLUORO-1,3-DICHLOROPROPANE
Everett E. Gilbert, Morris Township, Morris County, and Julian A. Otto, Stockholm, N.J., assignors to Allied Chemical Corporation, New York, N.Y., a corporation of New York
No Drawing. Filed July 3, 1963, Ser. No. 292,740
1 Claim. (Cl. 260—619)

This invention relates to new bisphenols and, more particularly, to 2,2-bis(4-hydroxyphenyl)1,1,3,3-tetrafluoro-1,3-dichloropropane and 2,2-bis(4-hydroxyphenyl)1,1,1,3,3-pentafluoro-3-chloropropane, their derivatives, and to a process for their production.

Bisphenols have long been recognized as one of the most valuable of chemical intermediates. They have been utilized as monomeric starting materials in the preparation of various resins such as epoxide resins and polyester resins and, further, have been converted into their corresponding linear polycarbonate resins.

These polycarbonate resins are one of the newest and most versatile members of the thermoplastic family. Such resinous material has been utilized over a wide range of industrial applications which have resulted in extraordinary high commercial success. Such wide acceptance is due to the fact that polycarbonate resins possess exceptional chemical and mechanical properties.

Polycarbonate resins have been utilized in injection molding, extrusion, compression molding, vacuum forming, blow molding, casting, cold rolling, heading, drawing, chopping and machining techniques. Such processes have produced fibers, elastomers, laminates, moldings, castings, translucent films and the like, all of which have found industrial application and commercial success.

It is a principal object of the present invention to provide new and useful bisphenols, i.e., 2,2-bis(4-hydroxyphenyl)1,1,3,3-tetrafluoro-1,3-dichloropropane, 2,2-bis(4-hydroxyphenyl)1,1,1,3,3-pentafluoro-3-chloropropane and their derivatives.

It is a further object of this invention to provide a process for the preparation of the bisphenols, 2,2-bis(4-hydroxyphenyl)1,1,3,3-tetrafluoro-1,3-dichloropropane, 2,2-bis(4-hydroxyphenyl)1,1,1,3,3-pentafluoro-3-chloropropane and their derivatives.

Other objects and advantages of the present invention will be apparent from the following description.

The bisphenols of this invention may be illustrated by the following formula:

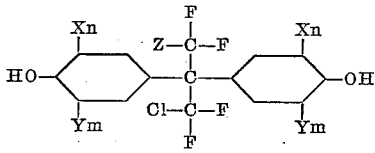

wherein Z is a halogen selected from the group consisting of chlorine and fluorine, X and Y are members selected from the group consisting of chlorine, bromine and alkyl radicals having from 1 to 4 carbon atoms and $n$ and $m$ are integers from 0 to 1.

2,2 - bis(4 - hydroxyphenyl)1,1,3,3 - tetrafluoro - 1,3-dichloropropane and its derivatives may be represented by the following general formula:

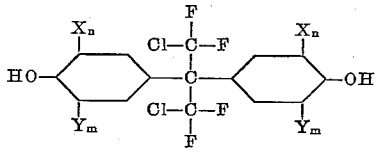

wherein X, Y, $m$ and $n$ are defined as given above.

2,2 - bis(4 - hydroxyphenyl)1,1,1,3,3 - pentafluoro-3-chloropropane and its derivatives may be represented by the following general formula:

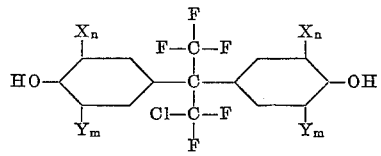

wherein X, Y, $m$ and $n$ are defined as set forth above.

The bisphenols of the present invention are readily prepared by reacting a ketone selected from the group consisting of 1,1,3,3-tetrafluoro-1,3-dichloroacetone and 1,1,1,3,3-pentafluoro-3-chloroacetone with a phenolic compound of the formula:

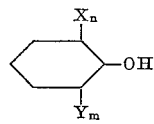

wherein X and Y are members selected from the group consisting of chlorine, bromine and alkyl radicals having from 1 to 4 carbon atoms and $n$ and $m$ are integers from 0 to 1, in a molar ratio of at least about 1.5 mols of phenolic compound per mol of ketone reactant, in the presence of boron trifluoride as catalyst and recovering the resulting bisphenol as product.

We have found that the new bisphenols of the present invention, when converted to their corresponding linear polycarbonate resins, possess higher thermal stability and lower moisture transmission than heretofore exhibited by polycarbonate resins, including those formed from 2,2-bis(4-hydroxyphenyl)hexafluoropropane. These polycarbonate resins and process for their preparation are described and claimed in copending application of Schmitt et al., Ser. No. 292,779, filed of even date, and now Patent No. 3,248,366.

1,1,3,3-tetrafluoro-1,3-dichloroacetone, hereinafter referred to as tetrafluorodichloroacetone, is a colorless liquid having a freeze point below −100° C. and a boiling point of 45.2° C. 1,1,1,3,3-pentafluoro-3-chloroacetone, hereinafter referred to as pentafluorochloroacetone, is a colorless gas having a boiling point of 7.8° C.

The phenolic compounds suitable for preparation of the subject bisphenols may be phenol or its alkylated or halogenated (i.e., brominated or chlorinated) derivatives, provided that such substituents occupy an ortho position with respect to the hydroxy group. The following compounds are illustrative of suitable reactants: phenol, o-cresol, 2,6-dimethylphenol, 2,6-diethylphenol, 2-chlorophenol, 2-bromophenol, 2,6-dichlorophenol, 2,6-dibromophenol, 2-chloro-6-bromophenol, 2-chloro-6-methylphenol, 2-isopropyl-6-methylphenol, 2-isopropyl-6-ethyl-phenol, 2,6-diisopropyl phenol, 2-isopropyl-6-tert-butyl phenol, 2-sec-butyl-6-methylphenol, 2-sec-butyl-6-ethylphenol, 2-sec-butyl-6-n-propylphenol, 2-tert-butyl-6-methylphenol, 2-tert-butyl-6-ethylphenol and 2-tert-butyl-6-n-butylphenol, and mixtures thereof.

It is believed that the reaction proceeds stepwise. For example, the reaction of tetrafluorodichloroacetone with phenol may be represented as follows:

(A) $C_6H_5OH + (F_2ClC)_2CO \rightarrow (F_2ClC)_2C(OH)C_6H_4OH$ (B) $(F_2ClC)_2C(OH)C_6H_4OH + C_6H_5OH \rightarrow$
$(F_2ClC)_2C(C_6H_4OH)_2 + H_2O$ In order to secure acceptable yields of 2,2-bis(4-hydroxyphenyl)1,1,3,3-tetrafluoro-1,3-dichloropropane, 2,2-bis(4-hydroxyphenyl)1,1,3,3-pentafluoro - 3 - chloropropane or their derivatives, molar ratios of at least about 1.5 mols of phenolic compound per mol tetrafluorodichloroacetone or pentafluorochloroacetone must be employed. Molar ratios less than 1.5 to 1 result in a variety of reaction products which cannot be said to consist primary of the bisphenols of the present invention. In other words, such molar ratios effect a loss of identity in the reaction mixture of the desired bisphenols which may only be clarified by implementing laborious purification and isolation procedures. Although the stoichiometric molar ratio of 2 mols phenolic compound per mol tetrafluorodichloroacetone or pentafluorochloroacetone produce acceptable yields of bisphenol, it is most desirable to utilize a molar ratio which provides a large excess of phenolic compound. It has been found that molar ratios up to about 20 mols phenolic compound per mol tetrafluorodichloroacetone or pentafluorochloroacetone may be used. Molar ratios of 3 to 8:1 are preferred to insure highest yields and maximum efficiency. For economic operation, excess phenolic compound is recovered, purified and reutilized.

Boron trifluoride is employed as catalyst to initiate the reaction of tetrafluorodichloroacetone or pentafluorochloroacetone with the phenolic compound. It has been found that use of boron trifluoride as catalyst enables the obtainment of high yields of high quality product without the necessity of employing strained reaction conditions such as superatmospheric pressure. The boron trifluoride catalyst may be added to the reaction mixture in its gaseous state, or, if desired, may first be admixed with the phenolic reactant to form a complex. Addition of boron trifluoride in the form of its complex is preferred since only minimum precautions are needed to retain the catalyst within the reaction area. It should be noted that when gaseous boron trifluoride is added to a reaction mixture containing phenolic compound, it immediately forms the complex in situ. However, in either event, boron trifluoride permits reaction at substantially atmospheric pressure. The amount of boron trifluoride added to the reaction mixture varies over the range of from about 0.1 to 2 mols per mol of water theoretically formed during reaction. In preferred operation, the boron trifluoride catalyst is added in approximately equimolar amount with respect to the theoretical amount of water formed.

The temperature at which reaction of tetrafluorodichloroacetone or pentafluorochloroacetone and phenolic compound occurs may vary over a wide range. Generally speaking, this range extends from about $-25°$ to $100°$ C. In use of substantially atmospheric pressure, as preferred, temperatures in the range of from about $-10°$ to $65°$ C. are employed.

If desired, the reactions may be carried out under pressure in order to allow for elevated reaction temperature up to $300°$ C. which, in turn, decreases reaction time to some degree. The reaction may be carried out at the autogenous pressure developed by the reactants and reaction products in a closed reaction vessel under the operating conditions.

If desired, a solvent may be utilized in order to eliminate layer separation and secure a homogenous mixture of reactants. Any suitable solvent may be employed with the proviso that it be inert under the conditions of reaction and allow for reaction at elevated temperatures. Suitable examples includes benzene, its alkylated and halogenated derivatives such as ortho, meta and para xylene, toluene, chlorinated aliphatic hydrocarbons such as methylene chloride, ethylene chloride and the like. The amount of solvent is not critical, and it generally is employed in the amount of 0.1 to 20 parts by weight per part of tetrafluorodichloroacetone or pentafluorochloroacetone.

The resulting bisphenol precipitates out from the reaction mixture substantially as it is formed which may comprise a period up to three weeks for complete reaction and recovery. In some instances, this precipitation may be accelerated by the addition of a non-solvent such as chloroform or hexane. For highest purity the crude bisphenol may be successively washed with water and nonsolvent for the product, followed by recrystallization from a suitable solvent such as toluene, filtered and then dried.

In preferred operation from about 3 to 8 mols phenolic compound in the form of a complex with boron trifluoride per mol tetrafluorodichloroacetone or pentafluorochloroacetone are admixed in a reaction vessel in the presence of a suitable solvent such as benzene. The boron trifluoride is present in approximately equimolar proportion based upon the water theoretically formed during reaction. The reaction mixture is then heated to a temperature from about $-10°$ to $65°$ C. at substantially atmospheric pressure for an extended period of time. The resulting bisphenol precipitates out and is recovered by filtration, washed with water and a nonsolvent, recrystallized from a solvent, filtered and finally dried.

The following examples are given for the purpose of illustration and should not be construed as limiting the present invention in any manner. In the examples parts are by weight.

*Example 1*

141 parts of boron trifluoride-phenol complex containing about 26 percent by weight boron trifluoride were admixed with 100 parts 1,1,3,3,-tetrafluoro-1,3-dichloroacetone and allowed to stand at room temperature for a period of 24 days. To the resulting reaction mixture was then added 100 parts of water and about 225 parts of chloroform and heated under constant agitation. 101 parts of crude 2,2-bis(4-hydroxyphenyl)1,1,3,3-tetrafluoro-1,3-dichloropropane separated from the reaction mixture, was filtered, washed with chloroform and dried. Additional purification was effected by recrystallizing the reaction product from toluene. 84 parts of purified 2,2-bis(4-hydroxyphenyl)1,1,3,3 - tetrafluoro - 1,3-dichloropropane having a melting point of $195°$ to $201°$ C. were recovered.

2,2 - bis(4 - hydroxyphenyl)1,1,3,3-tetrafluoro-1,3-dichloropropane is a crystalline solid having a melting point from $195°$ to $201°$ C. Elemental analysis showed 19.5 percent fluorine and 18.9 percent chlorine as compared to the theoretical analysis of 20.2 percent fluorine and 19.1 percent chlorine.

*Example 2*

141 parts of boron trifluoride-phenol complex containing 26 percent by weight boron trifluoride was admixed with 100 parts 1,1,3,3-tetrafluoro-1,3-dichloroacetone in about 90 parts of benzene. The resulting reaction mixture was heated to temperature of about $40°$ C. with constant agitation. After 14 days, 106 parts of crude 2,2-bis(4-hydroxyphenyl)1,1,3,3 - tetrafluoro - 1,3-dichloropropane separated from the reaction mixture and was isolated by filtration. The reaction product was purified by recrystallization from toluene and 88 parts of 2,2-bis(4-hydroxyphenyl)1,1,3,3-tetrafluoro-1,3-dichloropropane exhibiting melting point of $194°$ to $198°$ C. were recovered. The remaining liquid reaction mixture was washed with 200 parts water followed by washings with hexane and chloroform to precipitate any remaining 2,2-bis(4-hydroxyphenyl)1,1,3,3 - tetrafluoro - 1,3-dichloropropane still in solution. An additional 21 grams of product having melting point of $196°$ to $200°$ C. were obtained.

*Example 3*

128 parts of boron trifluoride-phenol complex was admixed with about 80 parts of toluene. 91 parts of pentafluorochloroacetone was bubbled into the resulting reaction mixture over a period of 6 hours at a temperature from about $40°$ to $55°$ C. This reaction mixture was then refluxed for a period of 4 hours. An additional 129 parts of boron trifluoride-phenol complex were then added followed by additional heating at $95°$ C. for 40 hours. At the end of this period the crude reaction mixture was cooled and diluted with about 1075 parts of chloroform and about 300 parts hexane followed by immersion in a Dry-Ice-bath. Crude 2,2-bis(4-hydroxphenyl)1,1,1,3,3-pentafluoro-3-chloropropane precipitated out, was isolated by filtration and washed with cold toluene and hexane. Purification was effected by recrystallization from about 400 parts of toluene. The resulting 2,2-bis(4-hydroxyphenyl)1,1,1,3,3-pentafluoro-3-chloropropane having a melting point of 169° to 171° C. was analyzed and found to contain 27.0 percent fluorine as compared to the theoretical value of 27.0 percent.

Example 4

108 parts of ortho cresol is saturated with boron trifluoride gas at room temperature. 50 parts of 1,1,3,3-tetrafluoro-1,3-dichloro-acetone is then added and the mixture is allowed to stand at room temperature for a period of 24 days. To the resulting reaction mixture is added 500 parts of water in about 225 parts of chloroform followed by continuous agitation and heating. 49 parts of 2,2-bis(2-methyl-4-hydroxyphenyl)1,1,3,3-tetrafluoro-1,3-dichloropropane as solid product separates and is recovered and isolated by filtration.

Example 5

129 parts of ortho chlorophenol is saturated with boron trifluoride gas at room temperature. To this solution is added 50 parts of 1,1,3,3-tetrafluoro-1,3-dichloroacetone and 80 parts benzene followed by heating at 40° C. for a period of 21 days. To the resulting reaction mixture is added 500 parts of water and 225 parts of chloroform followed by continuous agitation and heating. 60 parts of 2,2-bis(2-chloro-4-hydroxyphenyl)1,1,3,3-tetrafluoro-1,3-dichloropropane separates as solid product and is isolated by filtration.

The following example is given for the purpose of illustrating the manner in which the subject bisphenols may be readily converted into their corresponding linear polycarbonates.

Example 6

18.45 parts of 2,2-bis(4-hydroxyphenyl)1,1,3,3-tetrafluoro-1,3-dichloropropane were dissolved in 200 parts of a 1.5 percent by weight sodium hydroxide solution while maintaining an inert atmosphere provided for by blanketing the reaction mixture with nitrogen at temperature of 20° C. 267 parts of methylene chloride as solvent were then added to the mixture followed by agitation so as to disperse the aqueous phase into the solvent phase. Phosgene was slowly introduced over a 15 minute period into the reaction mixture until the pH was reduced to a level of about 6.6. 1.3 parts of benzyltrimethylammonium chloride in the form of a 10 percent by weight aqueous solution and an additional 4 parts of sodium hydroxide were added to the reaction mixture followed by continuous agitation for 1 hour. At the end of this period concentrated hydrochloric acid was added so as to acidify the mixture. The organic phase containing the resulting 2,2-bis(4-hydroxyphenyl)1,1,3,3-tetrafluoro-1,3-dichloropropane polycarbonate was separated and an additional 134 parts of methylene chloride were added followed by successive portions of water until the wash-water indicated no trace of chloride. Precipitation of 2,2-bis(4-hydroxyphenyl)1,1,3,3,-tetrafluoro-1,3-dichloropane polycarbonate was effected by the addition of the washed polymer solution to about 1370 parts of rapidly agitated heptane. The polycarbonate was isolated by filtration and dried at a temperature of about 17° C. under a pressure of about 0.5 mm. Hg. 16.9 parts of 2,2-bis(4-hydroxyphenyl)-1,1,3,3-tetrafluoro-1,3-dichloropropane polycarbonte having an inherent viscosity of 0.74 and a flow point of 295° to 315° C. were obtained.

Although certain preferred embodiments of the invention have been disclosed for purpose of illustration, it will be evident that various changes and modifications may be made therein without departing from the scope and spirit of the invention.

We claim:

2,2-bis(4-hydroxyphenyl)1,1,3,3-tertrafluoro-1,3-dichloropropane.

References Cited

UNITED STATES PATENTS 1,978,949   10/1934   Kohn et al. _____ 260—619
2,435,014   1/1948   Niederl _____ 260—619

OTHER REFERENCES

Knunyants et al.: Byulletin izobreteniy, 1959, No. 2, p. 29 (U.S.S.R.).

LEON ZITVER, *Primary Examiner.*

D. M. HELFER, H. ROBERTS, *Assistant Examiners.*